United States Patent [19]

Marsh

[11] 4,319,899
[45] Mar. 16, 1982

[54] AIR HANDLING SYSTEM FOR LAMINAR FLOW CLEAN ENCLOSURE

[75] Inventor: R. Claude Marsh, Albuquerque, N. Mex.

[73] Assignee: Pure Air Corporation, Canoga Park, Calif.

[21] Appl. No.: 144,693

[22] Filed: Apr. 28, 1980

[51] Int. Cl.³ .............................................. B01D 46/00
[52] U.S. Cl. ........................................ 55/416; 55/473; 55/DIG. 29; 98/33 R; 98/36; 98/115 LH; 415/219 C
[58] Field of Search ................... 55/385 A, 418, 416, 55/473, DIG. 29, DIG. 18; 98/36, 33 A, 33 R, 115 LH, 40 D; 415/219 C

[56] References Cited

U.S. PATENT DOCUMENTS

| | | | |
|---|---|---|---|
| 3,170,385 | 2/1965 | Tomkins | 98/36 |
| 3,273,323 | 9/1966 | Whitfield | 55/385 A |
| 3,426,512 | 2/1969 | Nesher | 98/115 LH |
| 3,511,162 | 5/1970 | Truhan | 98/36 |
| 3,776,121 | 12/1973 | Truhan | 98/36 |
| 3,811,250 | 5/1974 | Fowler, Jr. | 55/274 |
| 3,828,530 | 8/1974 | Peters | 55/473 |
| 3,861,894 | 1/1975 | Margh | 55/473 |
| 3,925,043 | 12/1975 | Matrone et al. | 55/473 |
| 3,928,008 | 12/1975 | Peterson | 55/473 |
| 3,986,850 | 10/1976 | Wilcox | 98/40 D |
| 4,100,847 | 7/1978 | Norton | 98/36 |

Primary Examiner—Bernard Nozick
Attorney, Agent, or Firm—Christie, Parker & Hale

[57] ABSTRACT

A laminar flow clean air enclosure has at least two spaced apart side walls and a planar filter extending between the side walls to define a work area. A transition duct couples air between the outlet of a blower and an entrance region near one end of the filter inlet to expand air leaving the blower outlet without introducing turbulence. A plenum chamber in communication with the entrance region and substantially the entire cross-sectional area of the filter inlet is formed so as to provide air at constant velocity to substantially the entire cross section of the filter inlet. As a result, the velocity of the air leaving the blower outlet is gradually reduced without turbulence to the desired exit velocity for the air leaving the filter. A perforated screen having a planar central region and an angled peripheral region covers the filter outlet. The peripheral region presents a higher density perforations than the central region and thereby forms between the side walls an air curtain that partially defines the work region.

16 Claims, 5 Drawing Figures

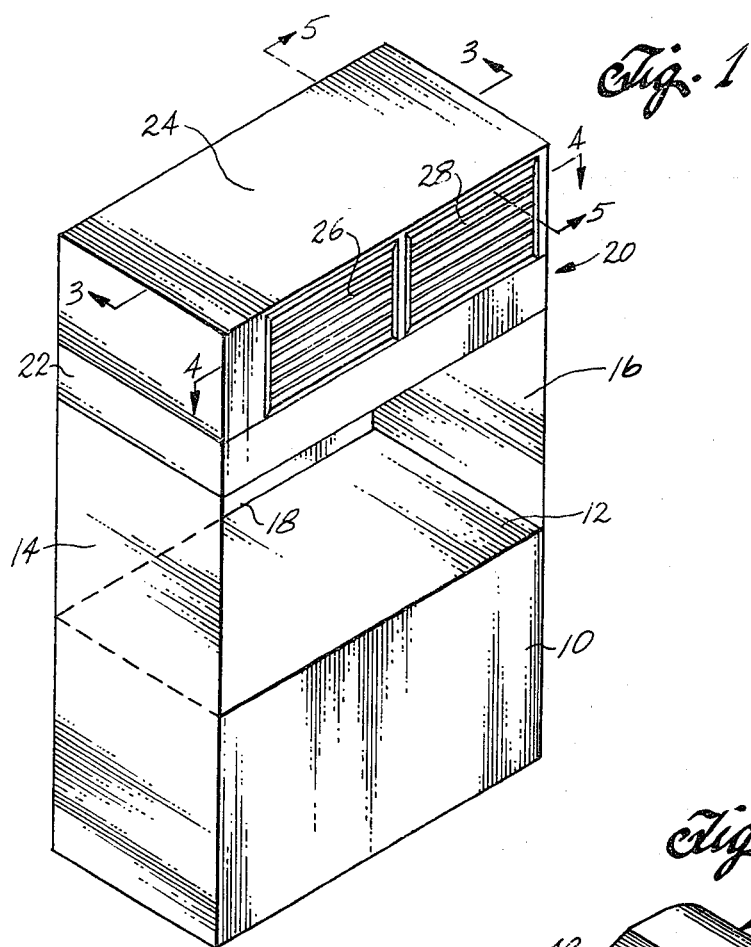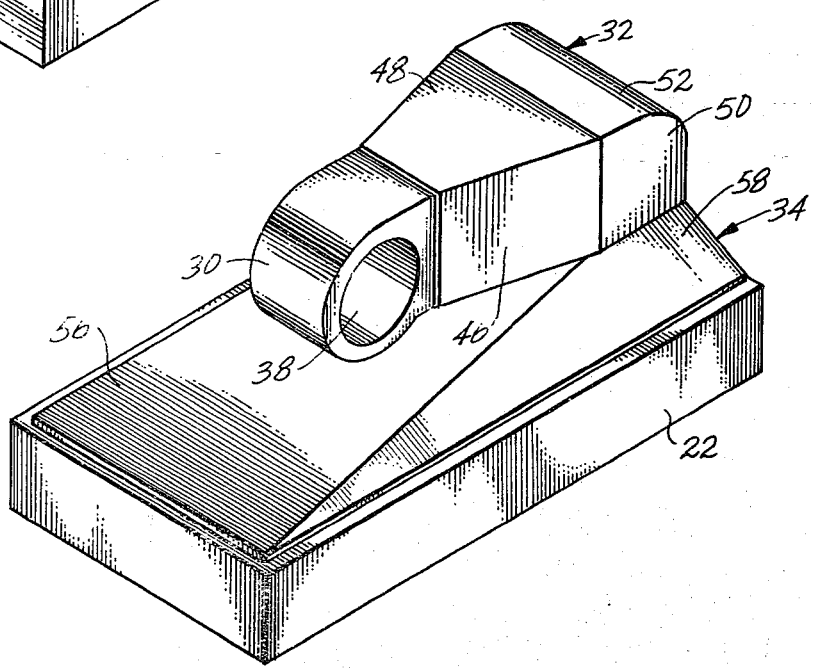

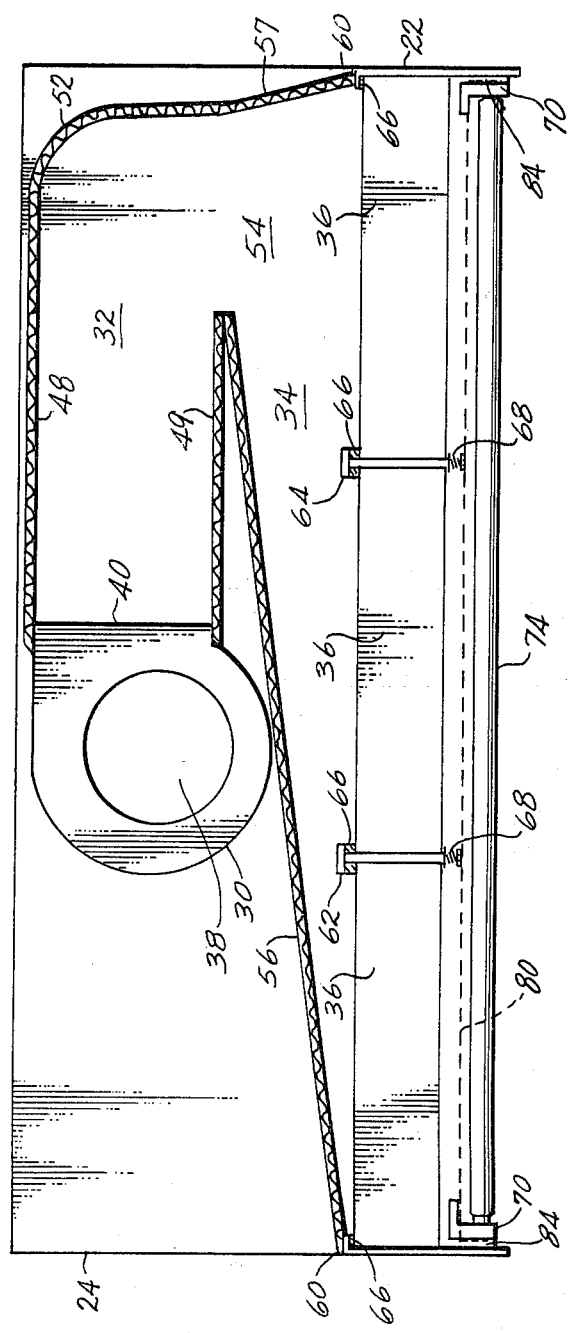

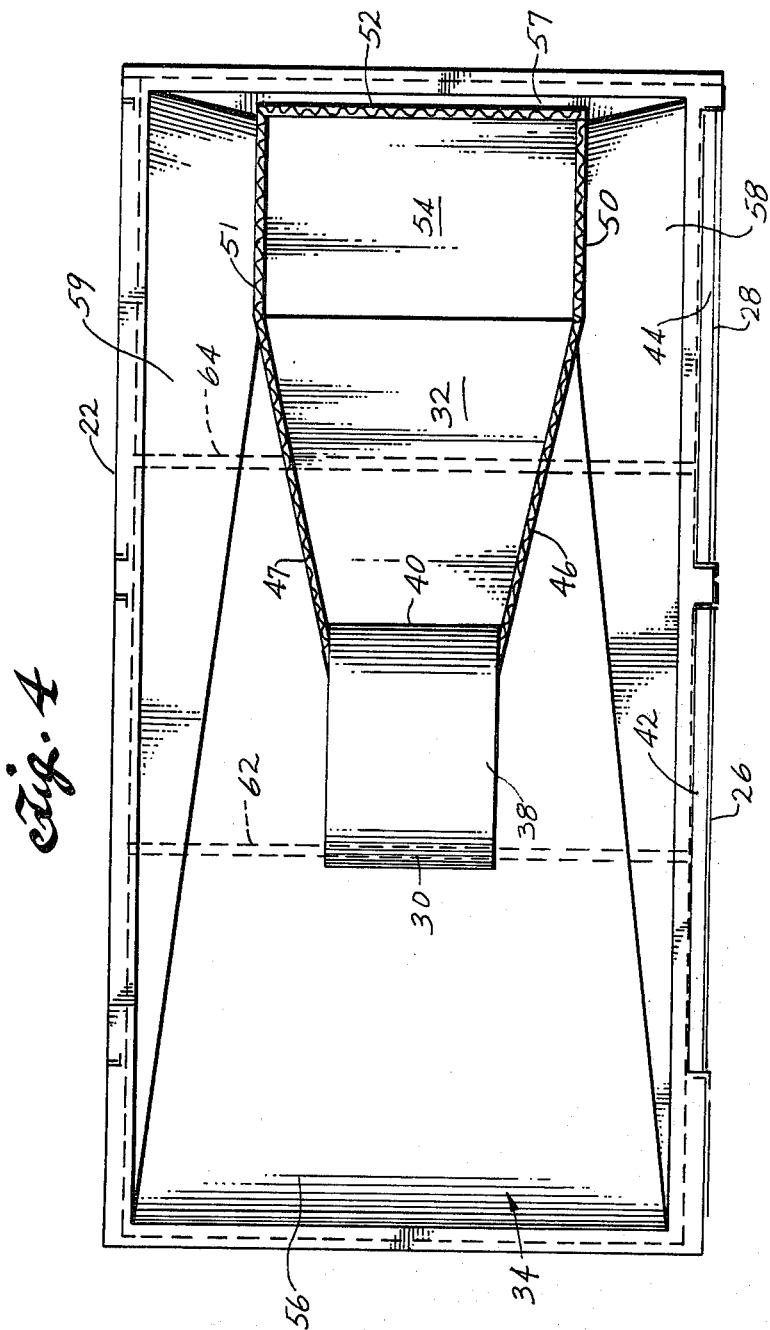

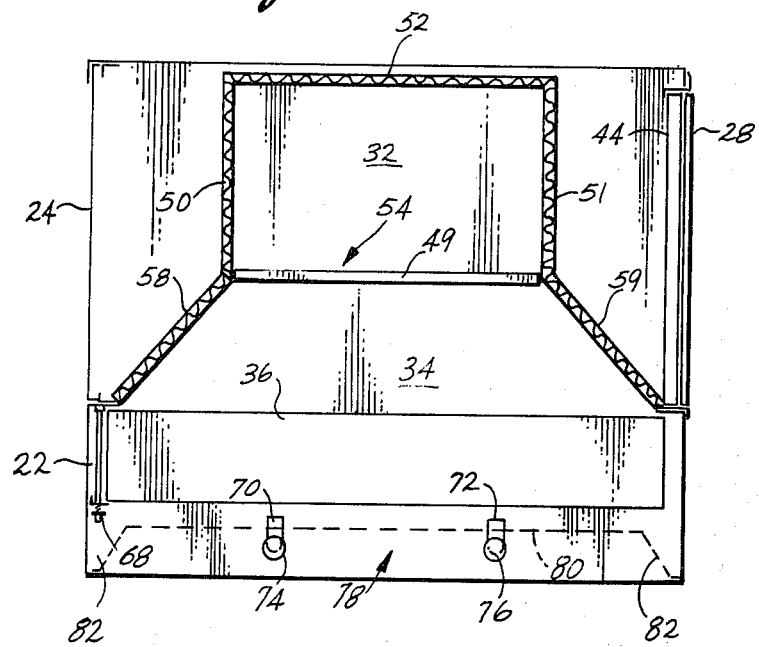

AIR HANDLING SYSTEM FOR LAMINAR FLOW CLEAN ENCLOSURE

BACKGROUND OF THE INVENTION

This invention relates to the establishment of a clean working environment and, more particularly, to an air handling system for a laminar flow clean enclosure.

In a number of industries, such as semiconductor integrated circuit manufacture, food processing, and the manufacture of medical supplies and pharmaceuticals, it is necessary or highly desirable to work in a dust-free or decontaminated, i.e., clean environment. In such case, the work is performed in a clean room or work station. One commonly used technique described in Whitfield U.S. Pat. Nos. 3,158,457 and 3,273,323, uses a large volume of filtered air under laminar flow conditions to establish a clean air environment. Specifically, a planar, submicron, so-called HEPA filter having a large cross-sectional area extends between two spaced apart side walls of a closed or partially open enclosure, such as a room or a work station. An air blower supplies air to the inlet of the filter via a plenum chamber adjacent to the enclosure under conditions that establish laminar air flow from the outlet of the filter in a direction transverse to the plane of the filter. An approximately uniform exit air velocity is required across the entire cross section of the filter outlet to maintain laminar flow conditions; in the presence of human movement and other normal ambient currents caused by heating and air conditioning, an airflow velocity of 90 feet per minute or better ±20% is customarily needed to prevent mixing of the clean air with contaminated ambient air. This technique may be viewed as producing an air piston across the full cross-sectional area of the enclosure that continuously moves through the enclosure.

As a practical matter, there is a limitation on the space that can be devoted to the plenum chamber feeding the inlet of the filter. The blower outlet has a much smaller cross-sectional area than the filter and emits air at a much larger velocity than the desired exit velocity from the filter. This creates a problem in reducing the high velocity of the air at the blower outlet before it reaches the filter inlet. If proper steps are not taken to so reduce the air velocity, uniform exit velocity across the filter outlet cannot be maintained and therefore turbulence will result. Present laminar flow air handling systems attempt to convert the entire velocity head at the blower outlet to static pressure before the air reaches the filter inlet by use of baffles and screens, which dissipate a substantial part of the energy imparted to the air by the blower. The static pressure is then partially reconverted to velocity head to provide the desired air velocity through the filter. This process results in substantial energy inefficiencies.

SUMMARY OF THE INVENTION

In contrast to the present practice, the invention only partially converts the velocity head to static pressure before delivery of blower air to the filter inlet in a laminar flow clean air system. Specifically, the velocity of the air leaving the blower outlet is gradually reduced without turbulence to the desired exit air velocity from the filter. No reconversion of static pressure to velocity head is necessary. In this way, a substantially more energy efficient air handling system can be attained, which permits the use of a blower having a lower power rating and, thus, consuming less energy.

According to one aspect of the invention, a gas-handling system comprising a planar filter having a large cross-sectional area, a blower having an outlet with a substantially smaller cross-sectional area than the filter, a plenum chamber in communication with the filter, and a coupling from the outlet of the blower to the plenum chamber is characterized, in that the coupling introduces gas from the blower into the plenum chamber with a substantial velocity component parallel to the plane of the filter and the plenum chamber is so shaped as to deliver gas from the blower to all parts of the filter at approximately uniform velocity. In the preferred embodiment, the coupling comprises a diverging section designed to expand gas flowing therethrough in a plane parallel to the plane of the filter without turbulence and an elbow section joining the diverging section to the plenum chamber near one end of the filter in spaced relationship therefrom. Assuming a filter with a rectangular cross section, the elbow section has a rectangular cross section opening to the plenum chamber with ends and sides both smaller than those of the filter. The plenum chamber has a pair of diverging end walls of different length extending from the ends of the elbow section to the respective ends of the filter and a pair of diverging side walls extending from the sides of the elbow section to the respective sides of the filter. The gradual expansion of air and corresponding reduction in its velocity without turbulence during transport of the air from the blower outlet to the filter inlet results in very little energy loss and accordingly, greater efficiency, while the plenum chamber shape permits air to exit from the filter outlet at approximately uniform velocity under laminar flow conditions.

According to another aspect of the invention, a laminar flow clean air enclosure comprises a work station defined by at least a pair of spaced apart side walls and a planar air filter having an outlet extending between the side walls and an inlet. Air is delivered to the filter inlet such that air exits the filter outlet under laminar flow conditions at approximately uniform velocity. An air curtain, which partially defines the work station is formed between the side walls along the other sides of the work region by air at higher velocity, preferably by means of a perforated screen covering the filter outlet. The screen has a planar central region parallel to the filter outlet and a peripheral region between the side walls. The peripheral region is at an angle to the filter outlet to present a higher density of perforations than the central region. As a result of this air curtain, the velocity of the air flowing through the central region of the screen and the air velocity flowing through the filter can be reduced, e.g., to 75 feet per minute, without reducing the protection from normal ambient air currents. The resulting improvement in efficiency permits a reduction in the power rating of the blower and, thus, the energy consumption thereof.

BRIEF DESCRIPTION OF THE DRAWINGS

The features of a specific embodiment of the best mode contemplated of carrying out the invention are illustrated in the drawings, in which:

FIG. 1 is a perspective view of a work station incorporating the principles of the invention;

FIG. 2 is a perspective view of the air handling module of FIG. 1 with the cover removed;

FIG. 3 is a front-sectional view of the air handling module;

FIG. 4 is a top-sectional view of the air handling module; and

FIG. 5 is an end-sectional view of the air handling module.

DETAILED DESCRIPTION OF THE SPECIFIC EMBODIMENT

In FIG. 1, a work station has a box shaped base 10 providing a horizontal work surface 12. Spaced apart vertical side walls 14 and 16 and a vertical back wall 18 extend upwardly from base 10. An air handling module 20 overlies surface 12 and is supported by side walls 14 and 16 and back wall 18. Module 20 includes a horizontal planar rectangular filter support frame 22 extending between side walls 14 and 16 in upwardly spaced relationship from surface 12 and a cover 24 that sits on frame 22. Contaminated room air is drawn into module 20 through grills 26 and 28 in cover 24 and clean air is expelled from module 20 in a downward direction transverse to the plane of frame 22 under laminar flow conditions in the manner described below in connection with FIGS. 2 through 5. Module 20 together with side walls 14 and 16, back wall 18, and surface 12 defines a partially open, clean air enclosure, which is used as a work region in processes or manufacturing operations requiring a clean air environment.

With reference to FIGS. 2 through 5, an air handling system in module 20 comprises a blower 30, a transition duct 32, a plenum chamber 34, and a plurality (3) submicron, so called HEPA filters 36.

Blower 30, which is secured to cover 24 or duct 32 by fasteners such as bolts, has a round inlet 38 facing toward grills 26 and 28 and a rectangular outlet 40 lying in a plane transverse to frame 22. Outlet 40 has a substantially smaller cross-sectional area than frame 22. Ambient air drawn into module 20 by blower 30 is precleaned by conventional prefilters 42 and 44, which lie behind grills 26 and 28, respectively, in cover 24.

Transition duct 32 comprises a diverging section defined by opposite diverging walls 46 and 47 and opposite parallel walls 48 and 49 and an elbow section defined by parallel walls 50 and 51 and a curved wall 52. Walls 46 through 48 extend from outlet 40 to one edge of walls 50 through 52, respectively, and wall 49 extends from outlet 40 toward the elbow section as far as wall 48, thereby defining with the edges of walls 50 through 52 an entrance region 54 near one end of frame 22. Entrance region 54 is spaced from frame 22 in a plane parallel thereto; it has a smaller cross-sectional area than frame 22 and a larger cross-sectional area than outlet 40. Transition duct 32 expands the air leaving outlet 40 in a plane parallel to frame 22, thereby reducing its velocity, and changes the direction of flow by 90° so flow is transverse to frame 22 as air passes across entrance region 54. Care is taken to design the diverging section, and in particular, the angle of divergence of walls 46 so as to maintain essentially non-turbulent flow conditions during expansion. In a typical embodiment, the angle of divergence between side walls 46 and 47 is 14°.

Plenum chamber 34, which couples entrance region 54 to frame 22, comprises opposite diverging back walls 56 and 57 extending from the edge of walls 49 and 52, respectively, to the ends of frame 22 and opposite diverging back walls 58 and 59 extending from the edges of walls 50 and 51, respectively, to the sides of frame 22.

Since entrance region 54 is near one end of frame 22, wall 57 diverges at a sharper angle relative to the plane of frame 22 than wall 56. Walls 58 and 59 preferably diverge at the same angle. Care is taken to design plenum chamber 34 so as to maintain essentially non-turbulent flow conditions therein. In particular, the angle formed by end wall 56 relative to the plane of frame 22 should not be so large as to cause boundary layer separation and thus turbulence. In a typical embodiment, this angle is 7°. Since wall 56 must extend from entrance region 54 all the way to the opposite end of frame 22, entrance region 54 must be sufficiently close to frame 22 so the angle formed by wall 56 does not exceed the value required for maintaining essentially non-turbulent flow. At any point in plenum chamber 34, the air velocity has a component parallel to frame 22 and a component perpendicular thereto. The perpendicular component flows through one of filters 36 and the parallel component flows on to another region of filters 36 further from entrance region 54. Plenum chamber 34 is designed so the perpendicular component is approximately the same at any point. As a result, the air flows through the entire cross section of filters 36 at an approximately uniform velocity. The parallel component decreases from an intermediate velocity at entrance region 54 to zero at the opposite end of frame 22. Since the mass flow rate through plenum chamber 34 parallel to filters 36 decreases as the air travels farther from entrance region 54, the cross-sectional area thereof taken in a plane perpendicular to the parallel direction of flow, i.e., in a plane perpendicular to frame 22 and parallel to its ends, must also decrease. Such a decrease in cross-sectional area is achieved by the convergence of wall 56 toward the end of frame 22 opposite to entrance region 54. To the extent possible, the decrease in cross-sectional area is designed to be equal to the decrease in mass flow rate due to the escape of air through filters 36, which results in an approximately uniform velocity throughout plenum chamber 34. Walls 46 through 52 and 56 through 59 could be constructed from conventional duct-forming board sealed at its edges and joints by conventional duct tape or could be fabricated from metal, if desired.

Frame 22 has lying in a common plane parallel to filters 36, a peripheral flange 60 and cross members 62 and 64, which provide surfaces for seals 66 between filters 36 and frame 22. Filters 36 are secured in frame 22 by fasteners 68. When supported by frame 22 as shown, filters 36 together form a planar HEPA filter network that is parallel to the plane of frame 22 and extends substantially the entire distance between side walls 14 and 16. Seals 66 form an air-tight fit between frame 22 and filters 36 so that all the air in plenum chamber 34 must pass through the HEPA filter network from its inlet adjacent to plenum chamber 34 to its outlet, which faces downward toward surface 12. Filters 36 are of a commercially available HEPA type, preferably filtering with 99.99% efficiency particles 0.3 microns and larger.

A pair of fluorescent lamp fixtures 70 and a pair of fluorescent lamp fixtures 72 are mounted on the inside surfaces of the ends of frame 22 below filters 36. Fluorescent lamps 74 and 76 engage fixtures 70 and 72, respectively, to illuminate the work region. A perforated screen is supported by frame 22 between filters 36 and lamps 74 and 76 to cover the outlet of the HEPA filter network. Screen 78 has a planar central region 80 parallel to the plane of the HEPA filter network, peripheral side regions 82 at an acute angle to the plane of the HEPA filter network, and peripheral end regions 84 at a right angle to the plane of the HEPA filter network. Peripheral end regions 84 lie outside the periphery of the outlet of the HEPA filter network and thus serve only as a means of attachment to frame 22. Peripheral side regions 82, however, lie adjacent to the peripheral of the outlet of the HEPA filter network and thus present to the air passing therethrough a higher density of perforations than central region 80 presents to the air passing therethrough. Consequently, vertical air curtains of higher velocity that partially define the work region are formed across the open front of the work region between side walls 14 and 16 and across the back of the work region along back wall 18 between side walls 14 and 16. It has been found that these air curtains permit a reduction in the exit velocity of the air through the HEPA filter network and, accordingly, the power rating and energy consumption of blower 30, without causing turbulance or mixture of the clean air with the adjacent contaminated ambient air due to normal ambient air currents. Side walls 14 and 16 serve to confine the air flowing from the HEPA filter network to the work region so it does not mix with contaminated ambient air. Instead of side walls 14 and 16, other air confining means such as the air curtains formed by peripheral regions 82 could be used.

In a typical embodiment, screen 78 has perforations with a 1/16 inch diameter and a density of 22 percent perforations, and peripheral regions 82 form a 60° angle with the plane of frame 22, the outlet velocity of blower 30 is 1,500 feet per minute, and the area of the HEPA filter network is 18 ft.$^2$. In such case, it has been found that the velocity of the air passing through the HEPA filter network could be reduced from 90 feet per minute to 75 feet per minute, i.e., by about 15%. The laminar air flow through central region 80, which travels at approximately 70 feet per minute, is isolated from the ambient air by the air curtains which travel at a velocity of approximately 150 feet per minute. The reason for providing an air curtain along the back of the work region is to permit the removal of back wall 18 and provide a work region open to both sides if desired.

The described air handling system gradually reduces the high velocity of the air leaving the blower outlet to the desired exit velocity from the HEPA filter network without creating turbulence and delivers such air to all parts of the filter inlet at approximately uniform velocity. This is accomplished by gradually expanding the air leaving the blower outlet in a plane parallel to the HEPA filter in transition duct 32 without turbulence so it passes entrance region 54 at an intermediate velocity and then further expanding and distributing the air in plenum chamber 34 so the air is delivered to each part of the inlet of the HEPA filter network at approximately the same velocity. Thus, the air leaves the outlet of the HEPA filter network at an approximately uniform velocity throughout its cross section, e.g., within ±20%. Consequently, no appreciable energy is dissipated in delivering the air from the blower outlet to the HEPA filter network and laminar flow conditions are maintained in the enclosure. The air curtains formed by perforated screen 78 reduce the required exit velocity from the outlet of the HEPA filter network. Typically an improvement in efficiency of the order of 40% can be achieved. By folding the air handling system between the blower outlet and the filter inlet back on itself as shown, the air may be gradually expanded over a path length that is longer than the side dimensions of the HEPA filter network, without extending the side dimensions of the module. Thus, the HEPA filter network covers substantially the entire surface of one side face of the module.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the HEPA filter network could be oriented vertically with laminar flow in a horizontal direction. Further, the described air handling module could be employed with a completely closed enclosure having an exhaust system or could be stacked vertically and/or horizontally to form one wall of an entire room. Further, the air handling module could be used under some circumstances without any side walls or with air curtains or hoods serving as air confining means. It might be advantageous under some circumstances to mount the blower at the end of the air handling module opposite to the entrance region so as to maximize the length of the transition duct and thereby fully utilize the available space within the module. Morever, although it is preferable to utilize both the gradual air velocity reducing feature and the air curtain feature in the same system, they could also be separately utilized to advantage.

What is claimed is:
1. A gas handling system comprising:
    a planar filter having a large cross-sectional area, a pair of ends and a pair of sides longer than the ends;
    a blower having an outlet with a substantially smaller cross-sectional area than the filter, the outlet of the blower being oriented to direct gas parallel to the plane of the filter;
    a plenum chamber in communication with the filter; and
    means for coupling the outlet of the blower to the plenum chamber,
    characterized in that the coupling means comprises a diverging section designed to expand gas flowing therethrough in a plane parallel to the plane of the filter and an elbow section joining the diverging section to the plenum chamber near one end of the filter in spaced relationship therefrom, the elbow section having ends and sides both smaller than those of the filter, thereby introducing gas from the blower into the plenum chamber with a substantial velocity component parallel to the plane of the filter and the plenum chamber is so shaped as to deliver gas from the blower to all parts of the filter at approximately uniform velocity.
2. The system of claim 1, in which the filter has a rectangular cross section, a pair of ends, and a pair of sides longer than the ends, the plenum chamber has a pair of diverging end walls of different length extending from the ends of the elbow section to the respective ends of the filter.
3. The system of claim 2, in which the plenum chamber has a pair of side walls diverging from the sides of the elbow section to the respective sides of the filter.
4. The system of claim 1, in which the filter and the elbow each have a rectangular cross-section.
5. The system of claim 4, in which the plenum chamber includes a wall extending from the elbow section and converging toward the one end of the filter.

6. The system of claim 5, in which the plenum chamber additionally includes a wall extending from the elbow section and converging toward the other end of the filter.

7. An air handling enclosure comprising:
a generally planar filter support frame;
an air blower located behind the filter frame, the air blower having an outlet with a cross-sectional area substantially smaller than the filter frame and lying transverse thereto;
an entrance region behind the filter frame and lying in a plane approximately parallel thereto, the entrance region having a cross-sectional area smaller than the filter frame and larger than the blower outlet;
a transition duct between the blower outlet and the entrance region to expand air leaving the blower outlet without introducing turbulence, the transition duct comprising a straight section and an elbow section connected together between the outlet of the blower and the entrance region, the straight section having diverging sides perpendicular to the plane of the filter frame and parallel sides parallel to the plane of the filter frame; and
a plenum chamber in communication with the entrance region and substantially the entire cross section of the filter frame, the plenum chamber being so formed as to provide air at approximately the same velocity to substantially the entire cross section of the filter frame when a filter is supported thereby.

8. The enclosure of claim 7, in which the filter frame has first and second ends and first and second sides and the plenum chamber has first and second sides diverging from the elbow section to the first and second ends, respectively, of the filter frame and third and fourth sides diverging from the elbow section to the first and second sides, respectively, of the filter frame.

9. The enclosure of claim 8, additionally comprising a perforated screen extending between the side walls adjacent to the frame, the screen having a planar central region parallel to the frame and a peripheral region between the side walls, the peripheral region being at an angle to the frame to present a higher density of perforations than the central region.

10. The enclosure of claim 9, in which the peripheral region of the screen is at an angle of approximately 60° to the frame.

11. The enclosure of claim 7, additionally comprising a perforated screen extending between the side walls adjacent to the frame, the screen having a planar central region parallel to the frame and a peripheral region between the side walls, the peripheral region being at an angle to the frame to present a higher density of perforations than the central region.

12. The enclosure of claim 7, in which the support frame is rectangular and the enclosure additionally comprises:
a five-sided cover, having an open side corresponding in size to the filter frame, the filter frame being connected to the open side of the cover to define therewith a space in which the blower, the transition duct, and the plenum chamber are disposed; and
an air inlet to the cover.

13. A gas handling system comprising:
a planar filter having a large cross-sectional area through which gas is to flow at a given uniform exit velocity, the filter having first and second parallel ends;
a blower having an outlet with a substantially smaller cross-sectional area than the filter transverse to the plane of the filter, the blower expelling air from its outlet at a substantially higher velocity than the given exit velocity;
a plenum chamber in communication with substantially the entire cross section of the filter, the plenum chamber having at the first end of the filter an entrance region with a cross-sectional area larger than the blower outlet and smaller than the filter, the plenum chamber having a flat back wall converging from the entrance region toward the second end of the filter so as to expand gas without turbulence to the given exit velocity and to deliver gas from the entrance region to the entire cross-sectional area at approximately the same velocity, namely the given exit velocity; and
coupling means between the blower outlet and the entrance region for expanding the gas leaving the blower outlet without turbulence until its velocity is reduced at the entrance region to a velocity larger than the given exit velocity, the coupling means comprising a straight section and an elbow section connected together, the straight section being connected to the blower outlet and the elbow section being connected to the entrance region, the cross-sectional area of the straight section increasing from the blower outlet to the elbow section.

14. The system of claim 13, in which the filter has first and second parallel sides perpendicular to its first and second ends, the ends being shorter than the sides, and the entrance region has first and second ends parallel to the respective first and second ends of the filter, and first and second parallel sides perpendicular to the first and second ends of the entrance region, the back wall of the plenum chamber extending from the second end of the entrance region to the second end of the filter, the plenum chamber additionally comprising:
a first flat side wall extending from the first side of the entrance region to the first side of the filter;
a second flat side wall extending from the second side of the entrance region to the second side of the filter; and
means for connecting the first end of the entrance region to the first end of the filter.

15. The system of claim 14, in which the outlet of the blower has first and second ends parallel to the ends of the filter and first and second parallel sides perpendicular to the plane of the filter, the first and second ends of the blower outlet are shorter than the first and second ends of the filter, and the straight section comprises:
first and second parallel end walls extending from the first and second ends of the blower outlet toward the first and second ends of the entrance region, respectively; and
first and second diverging side walls extending from the first and second sides of the blower outlet toward the first and second sides of the entrance region, respectively.

16. The system of claim 15, in which the blower is located directly behind the plenum chamber, the entrance region lies in a plane parallel to the filter, the connecting means comprises a flat end wall extending from the first end of the entrance region to the first end of the filter, and the elbow section comprises a curved wall connecting the first end wall to the first end of the entrance region and third and fourth parallel flat side walls connecting the first and second side walls and the edges of the curved wall to the first and second sides of the entrance region, respectively.

* * * * *

UNITED STATES PATENT AND TRADEMARK OFFICE
CERTIFICATE OF CORRECTION

PATENT NO. : 4,319,899
DATED : March 16, 1982
INVENTOR(S) : R. Claude Marsh

It is certified that error appears in the above—identified patent and that said Letters Patent is hereby corrected as shown below:

On the title page, Abstract, line 17, "density perforations: should read -- density of perforations --.

Column 5, line 6, "peripheral" should read -- periphery --.

Signed and Sealed this

Thirty-first Day of August 1982

[SEAL]

Attest:

GERALD J. MOSSINGHOFF

Attesting Officer   Commissioner of Patents and Trademarks